(12) United States Patent
Ueda et al.

(10) Patent No.: US 7,442,458 B2
(45) Date of Patent: Oct. 28, 2008

(54) FUEL CELL SYSTEM AND ACTIVATION SYSTEM THEREOF

(75) Inventors: Kenichiro Ueda, Saitama (JP); Shinji Yoshikawa, Saitama (JP); Junji Uehara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 115 days.

(21) Appl. No.: 11/105,793

(22) Filed: Apr. 13, 2005

(65) Prior Publication Data
US 2005/0238935 A1      Oct. 27, 2005

(30) Foreign Application Priority Data
Apr. 13, 2004     (JP)     ............... 2004-117427

(51) Int. Cl.
    *H01M 8/04*     (2006.01)
(52) U.S. Cl. ........................... 429/25; 429/13
(58) Field of Classification Search ............... 429/12, 429/13, 30, 34, 36, 22, 25
See application file for complete search history.

(56) References Cited

U.S. PATENT DOCUMENTS

2003/0022034 A1*    1/2003    Suzuki ................. 429/13

FOREIGN PATENT DOCUMENTS

JP     11-097047     4/1999
JP     2002-305017   10/2002

\* cited by examiner

*Primary Examiner*—Patrick Ryan
*Assistant Examiner*—Monique Wills
(74) *Attorney, Agent, or Firm*—Lahive & Cockfield, LLP; Anthony A. Laurentano, Esq.

(57)           ABSTRACT

A fuel cell system is equipped with a fuel cell for generating power by an electrochemical reaction of a fuel gas and an oxidizer gas, a fuel gas supply mechanism for supplying the fuel gas to the fuel cell, a supply amount adjustment mechanism for adjusting a supply amount of the fuel gas, a fuel gas flow passage for passing the fuel gas, a purge valve for purging a gas within the fuel gas flow passage outside, and a control mechanism for opening the purge valve when a stop request of the fuel cell is output, wherein when an activation request of the fuel cell is output, the control mechanism controls the supply amount adjustment mechanism so that a pressure within the fuel gas flow passage becomes smaller than a minimum pressure in a normal power generation and larger than an atmospheric pressure.

3 Claims, 7 Drawing Sheets

<Table>

FUEL CELL SYSTEM AND ACTIVATION SYSTEM THEREOF

BACKGROUND OF THE INVENTION

1. Field of the Invention

The present invention relates to a fuel cell system and an activation system thereof for discharging remaining water at an anode side by purging a fuel gas at a stop of a fuel cell.

2. Description of the Related Art

Generally, a fuel cell is configured by comparting a cathode at one side and an anode at the other side with sandwiching a proton conductive polymer electrolyte membrane (PEM) and generates power by an electrochemical reaction of oxygen in the air supplied to the cathode and hydrogen supplied to the anode. And in such a fuel cell system with such the fuel cell, if long time lapses from a power generation stop, there is a problem that: some gas (mainly a nitrogen gas) that does not participate in the power generation stays at the anode side by air invading the anode side through the polymer electrolyte membrane from the cathode side; and it takes time till a restart of the power generation because in such the case a partial pressure of the hydrogen at the anode side is in a state of being lowered in activating a next fuel cell.

As a technology for such the problem is conventionally known one that discharges a nitrogen gas remaining in a flow passage of an anode side by heightening a pressure at the anode side in activating a fuel cell (see paragraphs 0013 to 0017 and FIG. 2 of Japanese Patent Laid-Open Publication Hei. 11-97047). To be more precise, this technology once heightens the pressure at the anode side, then opens a purge valve, and purges the nitrogen gas by supplying a hydrogen gas (fuel gas) to the fuel cell in a state of the purge valve provided at the flow passage of the anode side being closed when activating the fuel cell. In addition, while purging the nitrogen gas, the technology always determines whether or not an output voltage of the fuel cell becomes not less than a predetermined value, and when the output voltage becomes not less than the predetermined value, the technology closes the purge valve and performs a normal power generation (hereinafter the above sequential operation is referred to as "OCV (Open Circuit Voltage) check". Meanwhile, in the technology, in order to shorten time taken for the OCV check, it is desirable to speedily purge the hydrogen gas remaining at the anode side by heightening the pressure at the anode side higher than in the normal power generation (hereinafter referred to as "first technology").

In addition, in the fuel cell system, because water is produced by an electrochemical reaction of hydrogen and oxygen, the water stops the fuel cell in a state of the water staying within the system; and then if long time lapses, there is a possibility that the water freezes in winter and a cold district.

As a technology for such the problem is conventionally known one that: a pressure at the anode side is once heightened by closing the purge valve of the anode side without stopping a supply of hydrogen; and then water remaining at the anode side is purged by opening the purge valve (see paragraphs 0009 to 0017 and FIG. 2 of Japanese Patent Laid-Open Publication No. 2002-305017). Meanwhile, in order to prevent a waste of fuel, the technology uses the pressure in the normal power generation and purges the water without heightening the pressure: in the technology it is desirable to open the purge valve as it is, without heightening the pressure when a stop request is output (hereinafter referred to as "second technology").

However, assuming a case that the first technology and the second technology are combined, because when a stop request is output during an OCV check (to be more precise, after the pressure at the anode side is heightened) in activation, the purge valve is opened as it is, a comparatively large amount of hydrogen should be discharged, and therefore, there occurs a problem that fuel is wasted.

Consequently, it is strongly requested a fuel cell system and an activation method thereof that can suppress an amount of a fuel gas discharged, even when a stop request is output during an OCV check.

SUMMARY OF THE INVENTION

A first aspect of the present invention to solve the problems described above is a fuel cell system that comprises a fuel cell for generating power by an electrochemical reaction of a fuel gas and an oxidizer gas, a fuel gas supply mechanism for supplying the fuel gas to the fuel cell, a supply amount adjustment mechanism for adjusting a supply amount of the fuel gas, a fuel gas flow passage for passing the fuel gas, a purge valve for purging a gas within the fuel gas flow passage outside, and a control mechanism for opening the purge valve when a stop request of the fuel cell is output, wherein when an activation request of the fuel cell is output, the control mechanism controls the supply amount adjustment mechanism so that a pressure within the fuel gas flow passage becomes smaller than a minimum pressure in a normal power generation and larger than an atmospheric pressure for a period from receiving the activation request till determining that the fuel cell becomes a state of being able to normally generate power.

In accordance with the first aspect of the present invention, if receiving the activation request of the fuel cell, the control mechanism controls the supply amount adjustment mechanism so that the pressure within the fuel gas flow passage becomes smaller than the minimum pressure in the normal power generation and larger than the atmospheric pressure for the period from receiving the activation request till determining that the fuel cell system becomes the state of being able to normally generate power. Therefore, even if in the midst of determining whether or not the fuel cell becomes the state of being able to normally generate power (that is, during an OCV check), the stop request is output and the purge valve is opened, an amount of the fuel gas discharged at a stop of the fuel cell can be suppressed because a pressure within the fuel gas flow passage is kept at the small pressure described above.

A second aspect of the present invention is a fuel cell system activation method that comprises a first step of supplying a fuel gas to a fuel cell when an activation request of the fuel cell is output; a second step of adjusting a pressure within a fuel gas flow passage so that the pressure within the fuel gas flow passage, where the fuel gas passes, becomes a predetermined value; and a third step of purging a gas within the fuel gas flow passage outside by the pressure adjusted in the second step, wherein a predetermined value in the second step is set to become smaller than a minimum pressure in a normal power generation and larger than an atmospheric pressure.

In accordance with the second aspect of the present invention, if the activation request of the fuel cell is output, the fuel gas is supplied to the fuel cell in the first step, then the pressure within the fuel gas flow passage is adjusted so as to become smaller than the minimum pressure in the normal power generation and larger than the atmospheric pressure in the second step, after then the fuel gas within the fuel gas flow passage is discharged outside in the third step. Therefore, even when a stop request is output, for example, for a period from the second step till the third step, an amount of the fuel gas discharged at a stop of the fuel cell can be suppressed because the pressure within the fuel gas flow passage is adjusted to the predetermined small value described above in the second step. In addition, an amount of the fuel gas discharged can also be suppressed in the third step (during an OCV check).

DESCRIPTION OF THE PREFERRED EMBODIMENTS

Next will be described an embodiment of the present invention in detail, referring to drawings as needed.

Figure 1:
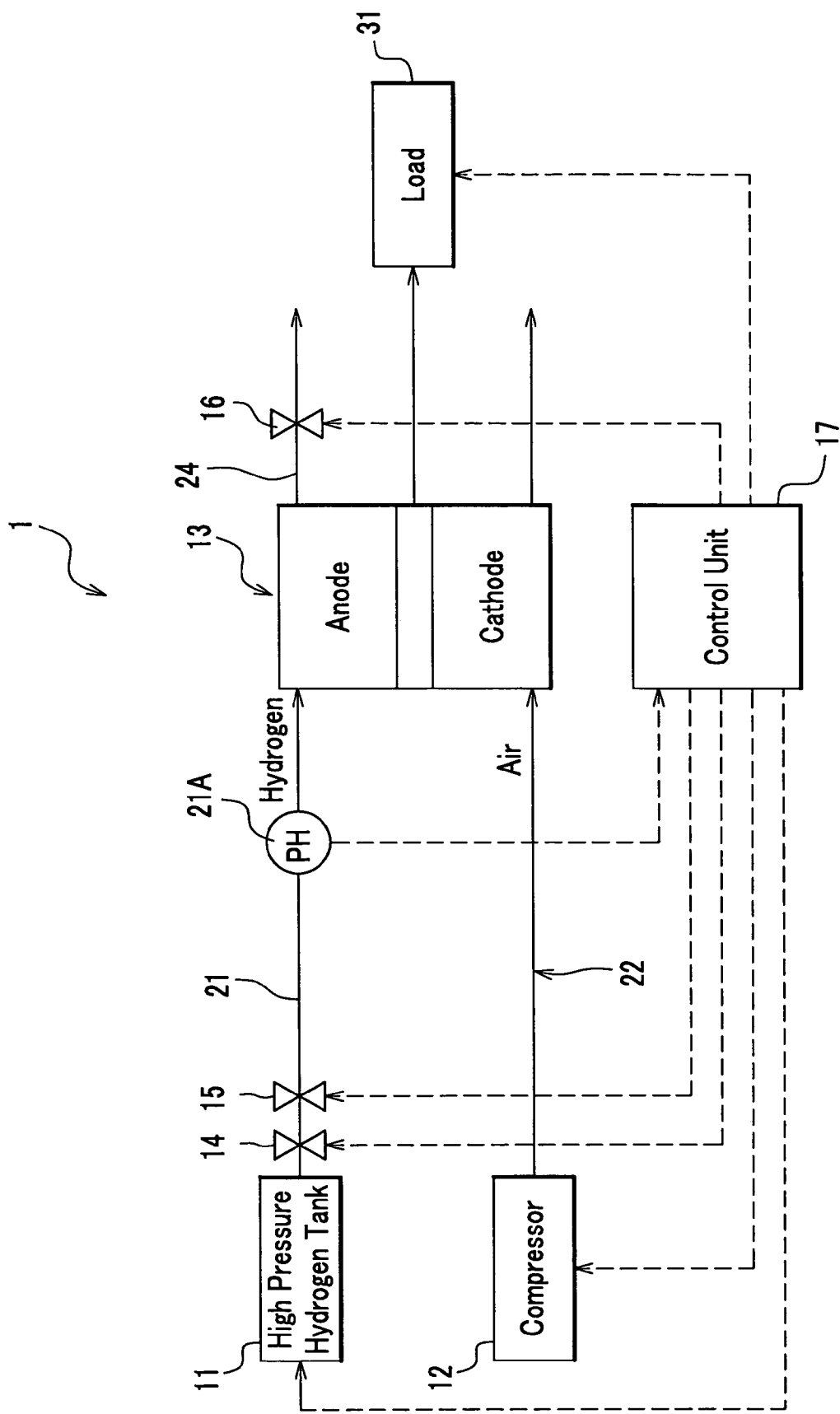
FIG. 1 is a configuration drawing showing a fuel cell system related to an embodiment of the present invention.

As shown in FIG. 1, a fuel cell system 1 is mainly equipped with a high pressure hydrogen tank (fuel gas supply mechanism) 11, a compressor 12, a fuel cell 13, a shut-off valve 14, a pressure adjustment valve (supply amount adjustment mechanism) 15, a purge valve 16, and a control unit (control mechanism) 17.

Within the high pressure hydrogen tank 11 is reserved a hydrogen gas (fuel gas) of a high pressure of several tens MPa, and the hydrogen gas is designed to be supplied to the fuel cell 13 by the shut-off valve 14 being opened. Meanwhile, between the high pressure hydrogen tank 11 and the fuel cell 13 is provide a tubular fuel gas supply passage (fuel gas flow passage) 21 that becomes a hydrogen gas passage; and at the fuel gas flow passage 21, from a side of the high pressure hydrogen tank 11 to that of the fuel cell 13 in order, are provided the shut-off valve 14, the pressure adjustment valve 15, a pressure sensor 21A. Meanwhile, the pressure sensor 21A always detects a pressure within the fuel gas flow passage 21 and outputs a signal indicating a pressure value thereof to the control unit 17.

The compressor 12 compresses air (oxidizer gas) and supplies it to the fuel cell 13. And between the compressor 12 and the fuel cell 13 is provided a tubular air supply passage 22 that becomes an air passage.

The fuel cell 13 generates power by electrochemically reacting a hydrogen gas supplied from the high pressure hydrogen tank 11 and air supplied from the compressor 12. In addition, to the fuel cell 13 is connected a load 31 such as a motor consuming electric power generated by the fuel cell 13, the load 31 is made ON/OFF, and thereby the fuel cell 13 is operated/stopped: in other words, a pick-up of a current from the fuel cell 13 is designed to be made ON/OFF (execution/stop).

The shut-off valve 14 changes a supply/stop of a hydrogen gas from the high pressure hydrogen tank 11 to the fuel cell 13 and is designed so that a solenoid coil not shown is excited by an activation current (ON signal) being supplied from the control unit 17 and to be opened by a movable plunger, which is not shown and is always energized in a close direction by a spring through magnetic force, being attracted with strong force.

The pressure adjustment valve 15 adjusts a pressure of a hydrogen gas supplied to the fuel cell 13 and is provided between the shut-off valve 14 and the fuel cell 13. In other words, a supply amount of the hydrogen gas is designed to be adjusted by an opening of the pressure adjustment valve 15 being appropriately adjusted by the control unit 17.

The purge valve 16 is appropriately opened/closed by the control unit 17 and is provided at a fuel gas discharge passage (fuel gas flow passage) 24 connected to an exit of the anode side of the fuel cell 13. In other words, the purge valve 16 being opened by the control unit 17, and thereby a gas within the fuel gas discharge passage 24 and a passage (not shown), which is formed at the fuel gas supply passage 21 and the fuel cell 13 (hereinafter, these are also simply referred to as "anode loop") is designed to be discharged outside.

When receiving an activation request of the fuel cell 13 output by, for example, a driver making an ignition switch ON and the like, the control unit 17 has a function of controlling the pressure adjustment valve 15 so that a pressure within the anode loop becomes smaller than a minimum pressure in a normal power generation and larger than an atmospheric pressure for a period from receiving the activation request till determining that the fuel cell 13 becomes a state of being able to normally generate power. To be more precise, when activating the fuel cell 13, the control unit 17 operates based on a flow (see FIG. 2) described later.

In addition, when receiving the stop request of the fuel cell 13 output by, for example, the driver making the ignition switch OFF and the like, the control unit 17 has a function of determining whether or not the stop request is output during an OCV check, and the control unit 17 is designed to operate based on either one of two flows (see FIGS. 3 and 4), depending on a determination result thereof Here as a method of determining whether or not the stop request is output during the OCV check can be adopted, for example, a method of determining whether or not predetermined time has lapsed from the activation request, a method of determining whether or not a power generation current is not less than a minimum value in the normal power generation, and the like. Meanwhile, other than the functions, the control unit 17 has functions similar to conventional ones of opening/closing the shut-off valve 14, making the load 31 ON/OFF, changing a rotation speed of the compressor 12, and the like.

Here will be described an operation (operation method of the fuel cell system 1) in activating the control unit 17, referring to FIGS. 1 to 3.

Figure 2:
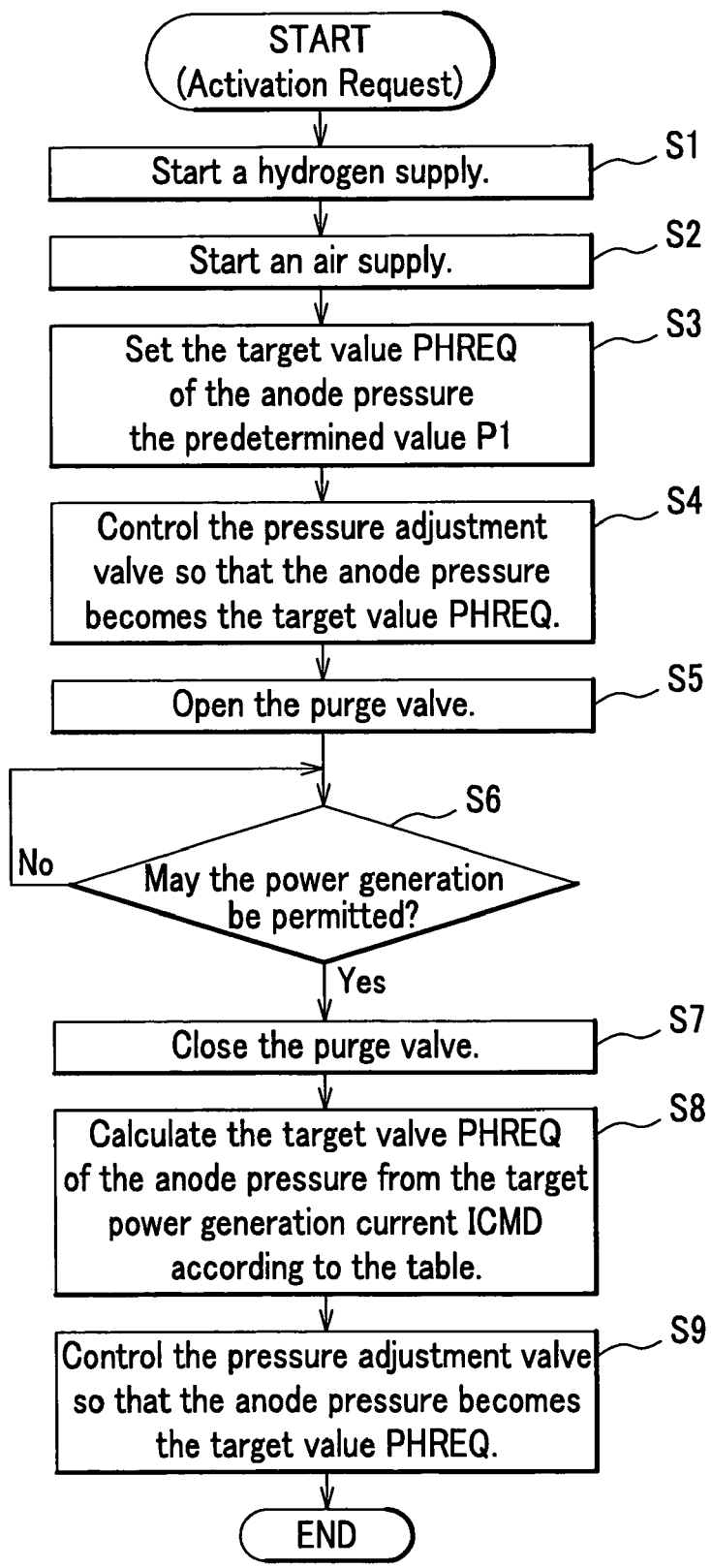
FIG. 2 is a flowchart showing an operation in activating a control unit.
Figure 3:
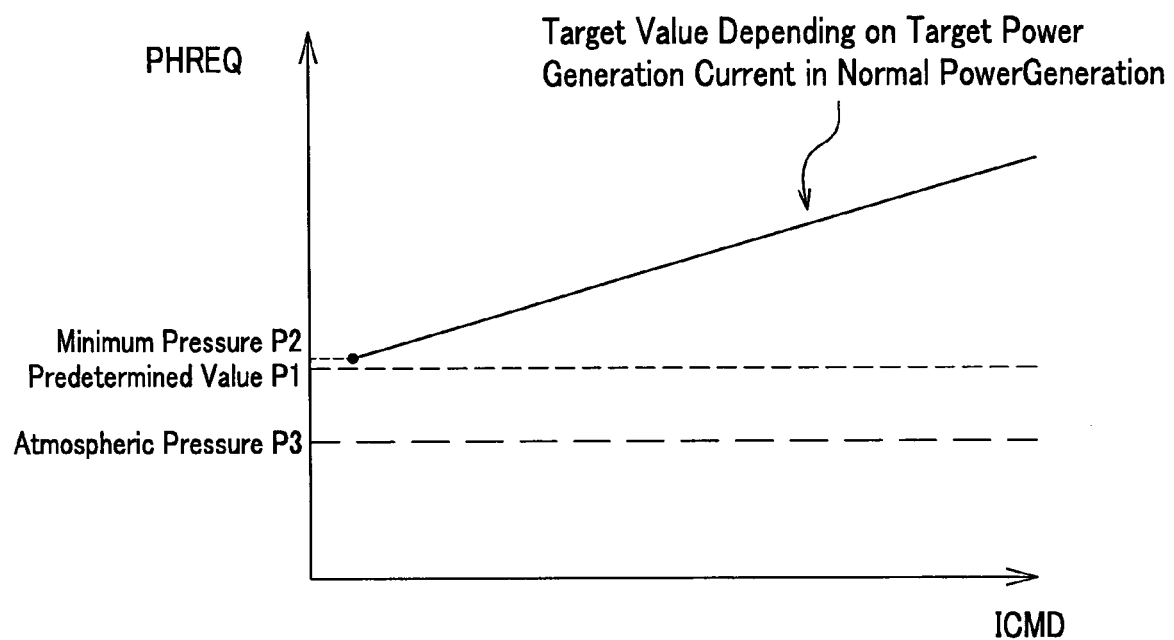
FIG. 3 is a drawing showing a table to be referred in a flow of FIG. 2.

As shown in FIG. 2, if receiving an activation request, the control unit 17 starts a supply of a hydrogen gas (step S1) by opening the shut-off valve 14 and starts a supply of air (step S2) by starting a drive of the compressor 12. And the control unit 17 sets a target value PHREQ of a pressure within the anode loop to be a predetermined value P1, which is smaller than a minimum pressure P2 in a normal power generation as shown in FIG. 3 and is larger than an atmospheric pressure P3 (step S3), and controls an opening of the pressure adjustment valve 15 so that the pressure within the anode loop becomes the target value PHREQ (predetermined value P1) set as above (step S4).

After then, by opening the purge valve 16 (step S5), the control unit 17 discharges a remaining gas (nitrogen gas and the like) within the anode loop outside and determines whether or not the normal power generation of the fuel cell 13 may be permitted (whether or not the fuel cell 13 is in a state of being able to normally generate power) by monitoring with a voltage meter (not shown) and the like whether or not an open cell voltage (voltage occurring when the load 31 is not made ON) of the fuel cell 13 is not less than a predetermined value (step S6). And when determining that the normal power generation is not permitted in the step S6 (No), the control unit 17 repeats the processing of the step S6.

In addition, when determining that the normal power generation may be permitted in the step S6 (Yes), the control unit 17 closes the purge valve 16 (step S7) and thereby ends the processing of the OCV check. After then, referring to a table (portion shown in a solid line) shown in FIG. 3, the control unit 17 calculates the target value PHREQ of the pressure within the anode loop from a value of a target power generation current ICMD (step S8), controls the opening of the pressure adjustment valve 15 (step S9) so that the pressure within the anode loop becomes the pressure value set in the step S8, and thereby the fuel cell system 1 transfers from the OCV check to the normal power generation. Here, the target power generation current ICMD means a current amount requested by, for example, a driver tramping on a gas pedal and is a value that increases/decreases accompanying an increase/decrease of the tramp-on amount of the gas pedal.

Subsequently, referring to FIGS. 1 to 4, an operation at a normal stop (a case of a stop request being output not during the OCV check) of the control unit 17 will be described.

Figure 4:
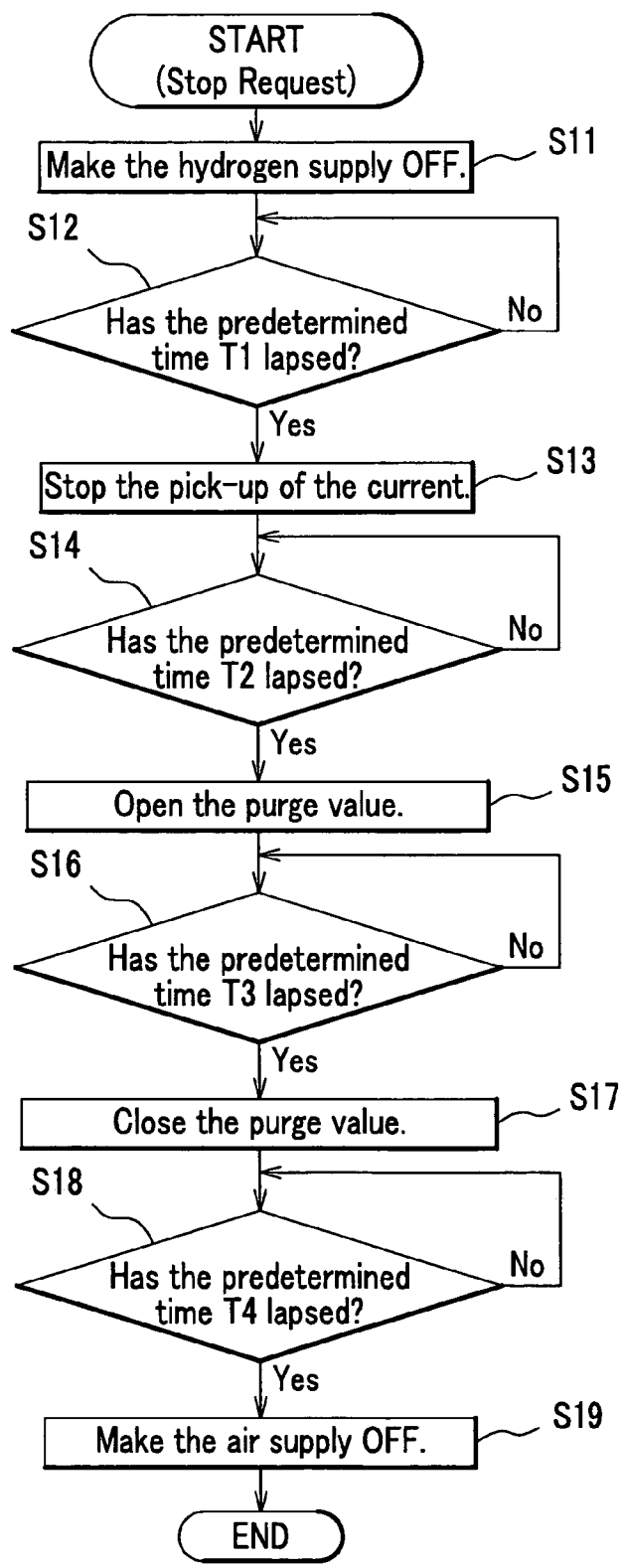
FIG. 4 is a flowchart showing an operation at a normal stop of a control unit.

As shown in FIG. 4, if receiving a stop request, the control unit 17 (see FIG. 1) stops a supply of a hydrogen gas (step S11) by closing the shut-off valve 14 and determines whether or not a predetermined time T1 has lapsed (step S12). Here the predetermined time T1 is time needed from a close of the shut-off valve 14 till a pressure within the anode loop being lowered to the predetermined pressure P1 (see FIG. 6). Meanwhile, the pressure within the anode loop in the step S12 lowers by a hydrogen gas within the anode loop being consumed by the fuel cell 13.

In the step S12, if determining that the predetermined time T1 has not lapsed (No), the control unit 17 again repeats the processing of the step S12; and if determining that the predetermined time T1 has lapsed (Yes), the control unit 17 stops a pick-up of a current from the fuel cell 13 (step S13) by making the load 31 OFF. After the step S13 the control unit 17 determines whether or not a predetermined time T2 has lapsed (step S14). Here the predetermined time T2 is time necessary for purging condensed water produced by a power generation outside from within a cathode loop (passage (not shown) formed at the air supply passage 22 and the fuel cell 13).

In the step S14, if determining that the predetermined time T2 has not lapsed (No), the control unit 17 again repeats the processing of the step S14; and if determining that the predetermined time T2 has lapsed (Yes), the control unit 17 opens the purge valve 16 (step S16), and purges condensed water remaining within the anode loop by a pressure of the predetermined value P1 higher than an atmospheric pressure. After the step S15 the control unit 17 determines whether or not a predetermined time T3 has lapsed (step S16). Here the predetermined time T3 is time needed from an open of the purge valve 16 till a pressure within the anode loop being lowered to a predetermined pressure P4 (see FIG. 6).

In the step S16, if determining that the predetermined time T3 has not lapsed (No), the control unit 17 again repeats the processing of the step S16; and if determining that the predetermined time T3 has lapsed (Yes), the control unit 17 closes the purge valve 16 (step S17), and completes the purge processing within the anode loop. After the step S17 the control unit 17 determines whether or not a predetermined time T4 has lapsed (step S18). Here the predetermined time T4 is time necessary for lowering a hydrogen concentration to a predetermined value in diluting hydrogen and discharging it outside by mixing a hydrogen gas purged and air.

In the step S18, if determining that the predetermined time T4 has not lapsed (No), the control unit 17 again repeats the processing of the step S18; and if determining that the predetermined time T4 has lapsed (Yes), the control unit 17 stops the supply of air to the fuel cell 13 (step S19) by stopping the compressor 12 and ends the stop-processing according to this flow.

Subsequently, an operation of the control unit 17 will be described when a stop request is output during an OCV check, referring to FIG. 5.

Figure 5:
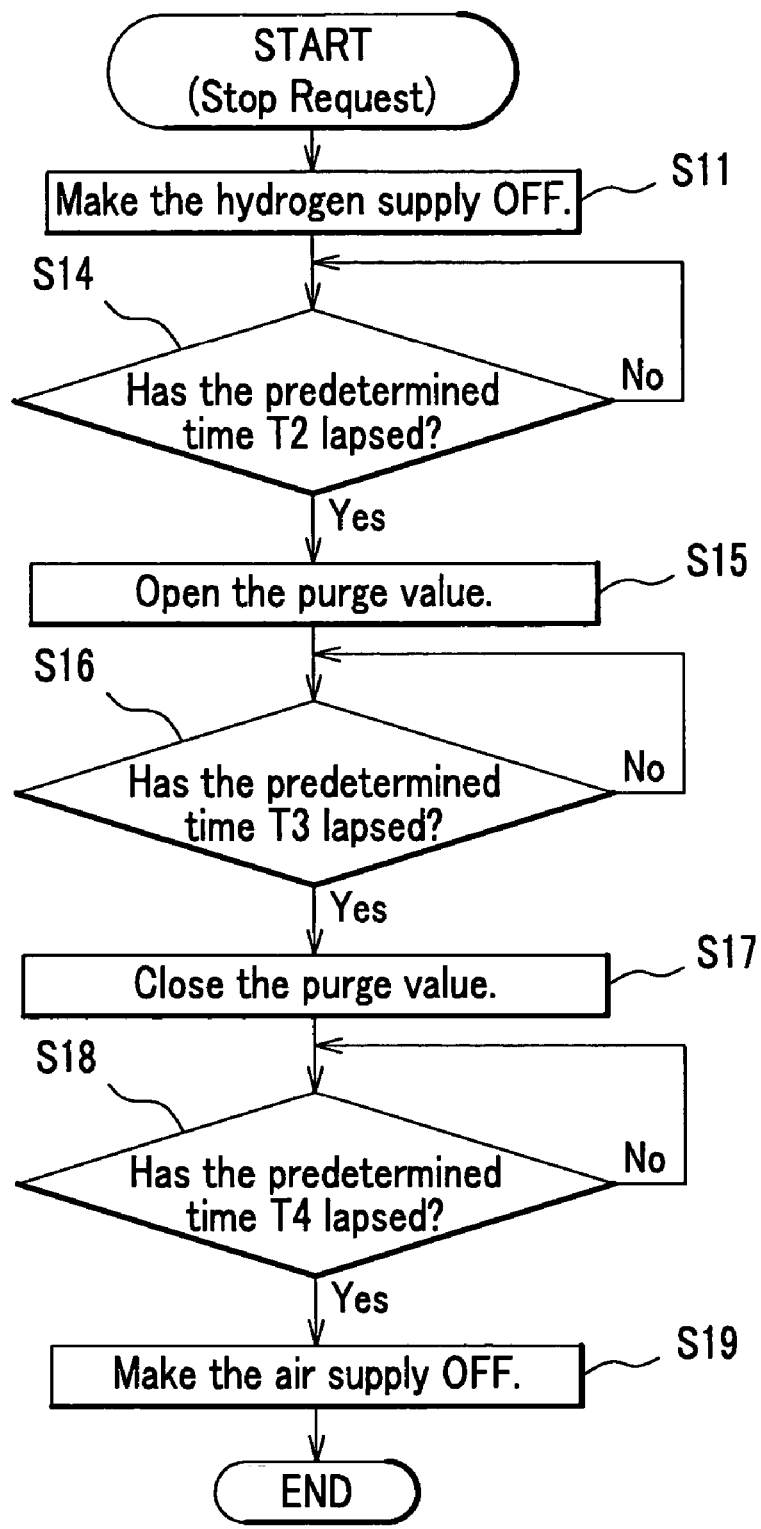
FIG. 5 is a flowchart showing an operation of a control unit when a stop request is output during an OCV check.

As shown in FIG. 5, this flow is designed to be a configuration where the processings of the steps S12 and S13 are excluded from the flow shown in FIG. 4. In other words, because a pressure within the anode loop is kept at the predetermined value P1 during the OCV check and the fuel cell 13 is in a state of not being operated (see FIG. 2), in this flow are not needed the processing of lowering the pressure within the anode loop to the predetermined value P1 by the operation of the fuel cell 13 as in the step S12 and the processing of stopping the operation of the fuel cell 13 as in the step S13.

Next will be described a normal stop-processing and a stop-processing during the OCV check and an amount (discharge hydrogen amount) of a hydrogen gas discharged in each stop-processing, referring to time charts shown in FIGS. 6 and 7.

Figure 6:
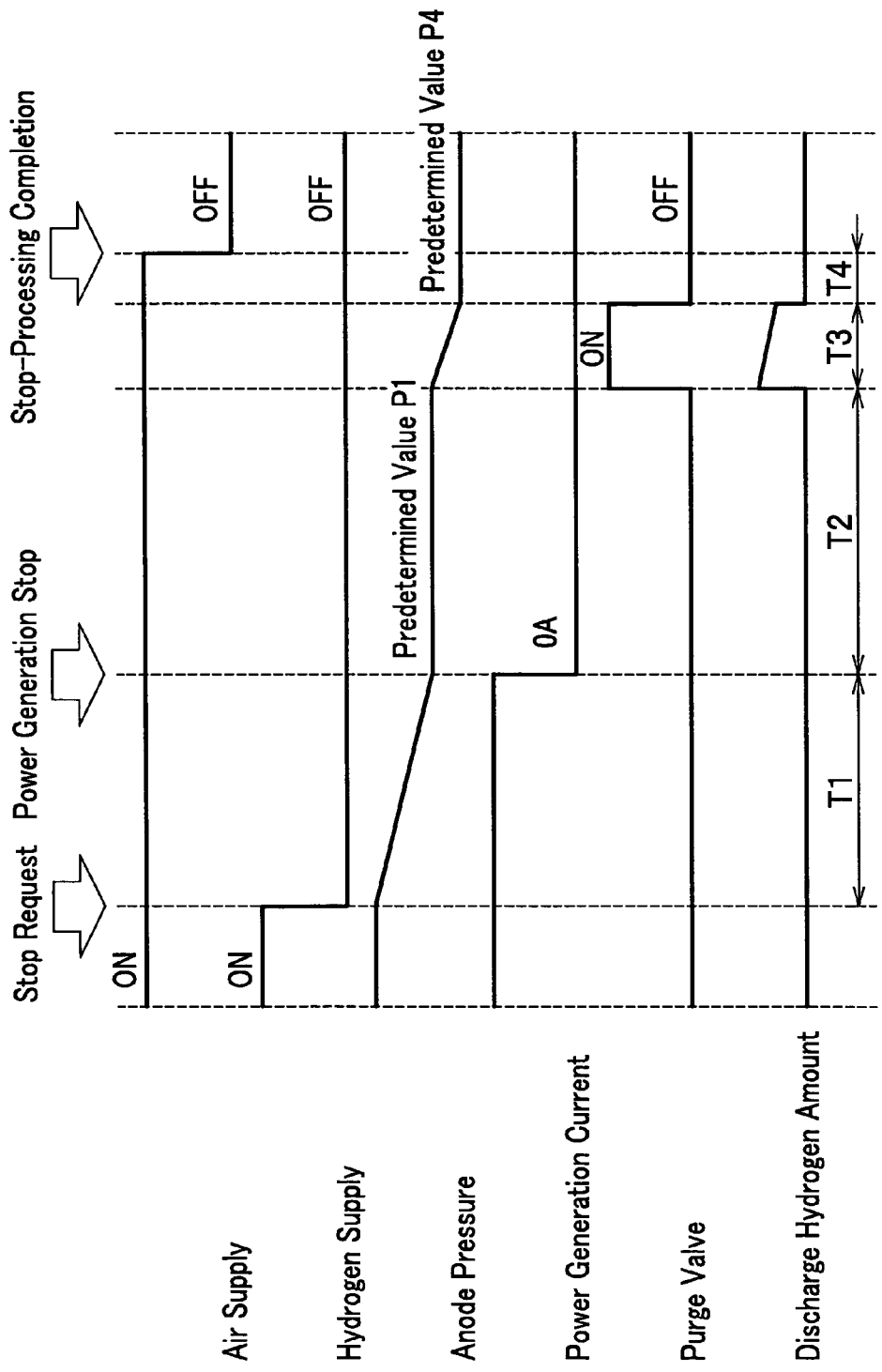
FIG. 6 is a time chart showing a normal stop-processing.

In the normal stop-processing, as shown in FIG. 6, when a stop request is output, a hydrogen supply is stopped, and then a pressure within the anode loop gradually lowers by an operation of the fuel cell 13. After then if the pressure within the anode loop becomes the predetermined value P1, the power generation is stopped. And although if the predetermined time T2 lapses after the stop of the power generation, the purge valve 16 is opened, a discharge hydrogen amount of the anode loop becomes a comparatively small amount because the pressure within the anode loop is lowered to the predetermined value P1 at the open of the purge valve 16.

Figure 7:
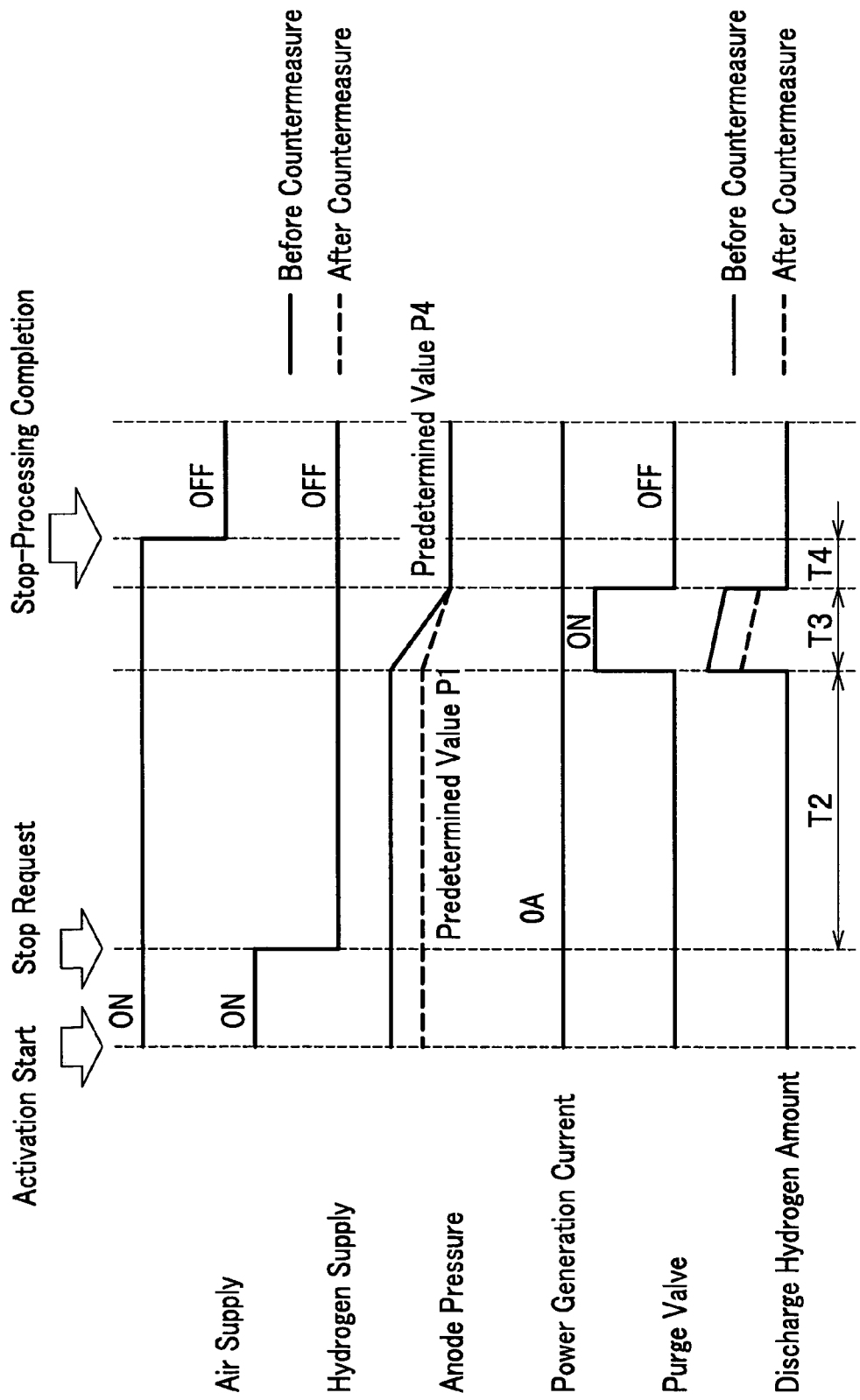
FIG. 7 is a time chart showing a stop-processing during an OCV check.

In addition, as shown in FIG. 7, if in the stop-processing during the OCV check a stop request is output direct after an activation start (for example, between the steps S4 and S5 of FIG. 2), a hydrogen supply is stopped. And although if the predetermined time T2 lapses after the stop of the hydrogen supply, the purge valve 16 is opened, a discharge hydrogen amount of the anode loop becomes a comparatively small amount substantially same as in the normal stop-processing (FIG. 6) because the pressure within the anode loop is kept at the predetermined value P1 by control (the step S4 in FIG. 2) during the OCV check at the open of the purge valve 16. Here in FIG. 7, comparing a result (result obtained in the embodiment) after a countermeasure shown in a bold dotted line and a result (result obtained in a case of making the pressure within the anode loop during the OCV check higher than the minimum pressure P2 in the normal power generation) before the countermeasure shown in a bold solid line, it turns out that the discharge hydrogen amount becomes less in the embodiment than before the countermeasure.

Thus in the embodiment following effects can be obtained:

Because if the stop request of the fuel cell 13 is output during an OCV check, a pressure within the anode loop is kept the predetermined value P1 (a small value) during the OCV check, an amount of a hydrogen gas discharged at a stop of the fuel cell 13 can be suppressed minimum.

In a stop-processing of a case of a stop request being output during an OCV check, because the flow (see FIG. 5) is referred where the steps S12 and S13 are excluded from the flow (see FIG. 4) showing the normal stop-processing, the stop-processing can be completed earlier than the normal stop-processing by the predetermined time T1.

Thus, although the embodiment of the present invention is described, the invention is not limited thereto and various variations are available without departing from the spirit and scope of the invention.

What is claimed is:

1. A fuel cell system activation method comprising:
   receiving an activation request to operate a fuel cell;
   in response to the activation request, supplying a fuel gas to the fuel cell;
   adjusting a pressure within a fuel gas flow passage so that the pressure within said fuel gas flow passage, where said fuel gas passes, becomes a predetermined value; and
   purging a gas within said fuel gas flow passage by the adjusted pressure,
   wherein the predetermined value is set to become smaller than a minimum pressure in a normal power generation and larger than an atmospheric pressure.

2. The fuel cell system activation method of claim 1, further comprising:
   receiving the stop request before said fuel cell becomes a state of being able to normally generate power;
   maintaining the pressure of the predetermined value within the fuel gas flow passage during a period from receiving the stop request until purging the fuel gas within said fuel gas flow passage; and
   purging the fuel gas within said fuel gas flow passage with the pressure of the predetermined value.

3. The fuel cell system activation method of claim 1, further comprising:
   operating the fuel cell to generate power normally;
   receiving the stop request after said fuel cell generates power normally;
   reducing the hydrogen pressure of the normal power generation to the pressure of the predetermined value; and
   purging the fuel gas within said fuel gas flow passage with the pressure of the predetermined value.

* * * * *